UNITED STATES PATENT OFFICE.

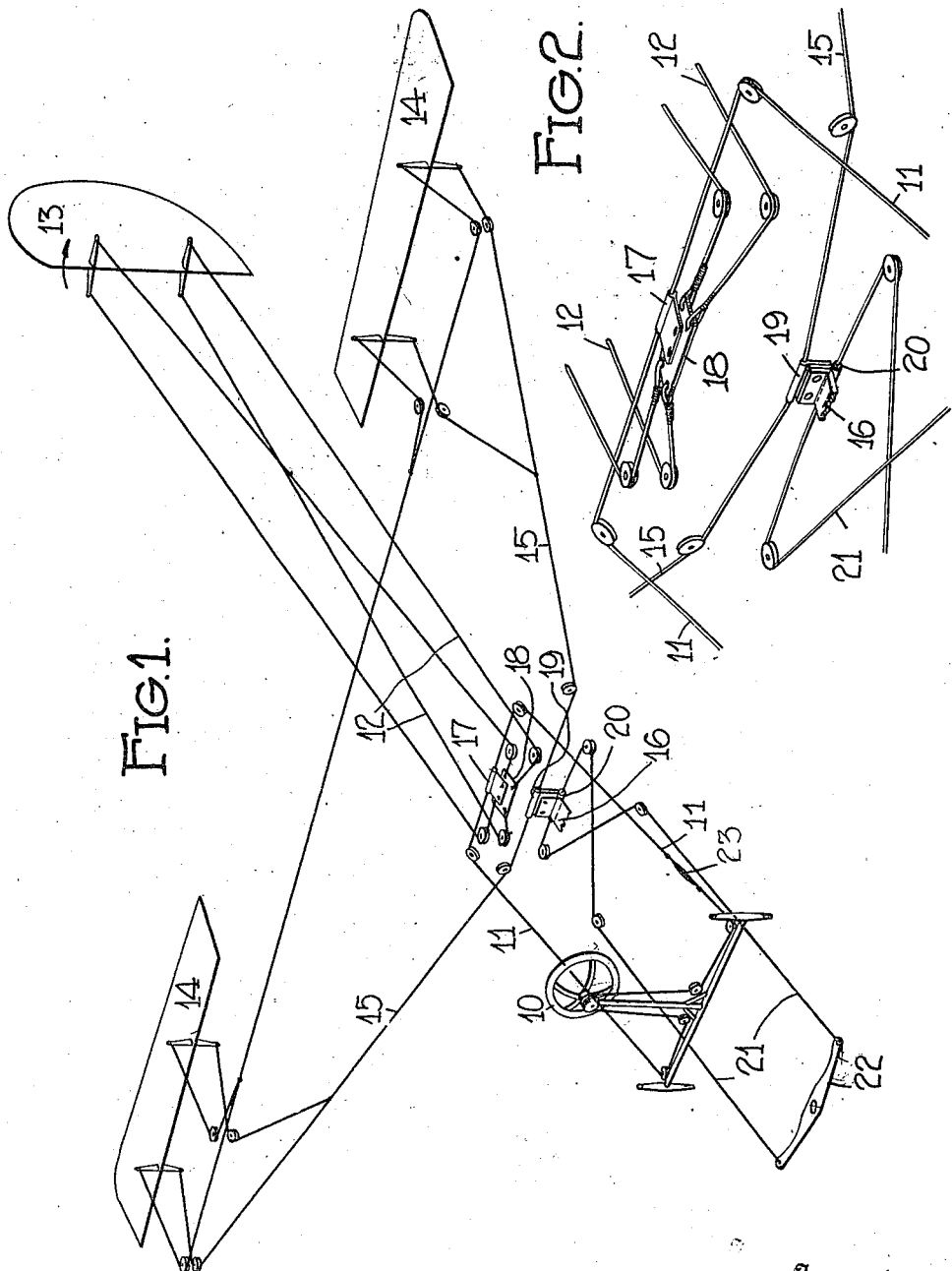

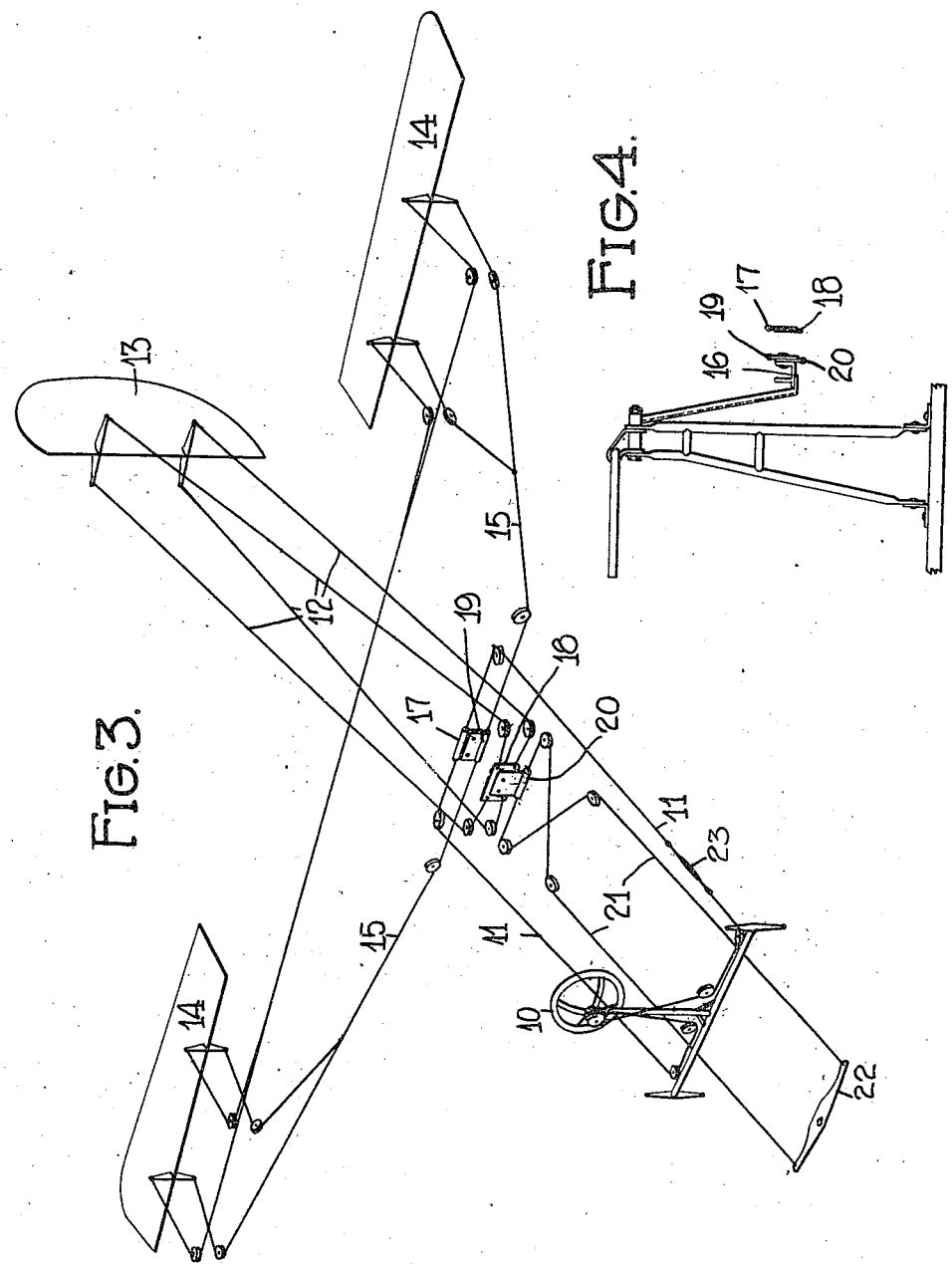

NELSON W. DALTON, OF BUFFALO, NEW YORK, ASSIGNOR TO CURTISS AEROPLANE AND MOTOR CORPORATION, A CORPORATION OF NEW YORK.

CONVERTIBLE CONTROL SYSTEM.

1,296,773.   Specification of Letters Patent.   Patented Mar. 11, 1919.

Application filed October 13, 1916. Serial No. 125,420.

*To all whom it may concern:*

Be it known that I, NELSON W. DALTON, a citizen of the United States, residing at Buffalo, in the county of Erie and State of New York, have invented certain new and useful Improvements in Convertible Control Systems, of which the following is a specification.

A convertible control is one which may be converted from a control of one type into a control of another type; thus for instance, a Wright type of control mechanism might be converted into a stick control of the Bleriot or Esnault-Pelterie types. Thus the Curtiss control may be converted into the Deperdussin and so on. Applicant believes himself to be the first to have produced a convertible control mechanism. That which he illustrates is the latter mentioned, that is the Curtiss-Deperdussin.

Broadly speaking, the system comprises the elements common to both types of control mechanisms, the additional elements individual to each one, and the control rudders or other devices of the aeroplane together with coupling devices arranged to properly interconnect the elements of the control mechanisms and the rudders according to the system of control it is desired to operate. Obviously, this invention may be accomplished by the combination of any known types of aeroplane control.

Of the drawings:

Figure 1 is a perspective sketch showing one method of converting my convertible aeroplane control device;

Fig. 2 is a detailed perspective view;

Fig. 3 is a perspective view showing a second method of connecting;

Fig. 4 is an elevation of the shoulder brace used in connection with the method of Fig. 1.

In the above mentioned figures, it may be pointed out that the control cables leading from the ailerons 14, the rudder 13 and those attaching directly to the wheel 10, the footbar 22 and the shoulder brace 16 are all led to a common position whereby their immediate proximity permits of their connection in various combinations, hereinafter referred to, by means of the coupling devices designated as 17, 18, 19 and 20. For purposes of description and in order to disclose the features of this apparatus, one form of coupling device such as hinged plates 17, 18, 19 and 20 will be used hereinafter, although this form of coupling device is not considered essential to the correct operation of the convertible control.

In Fig. 1 is illustrated the convertible aeroplane control connected in such manner as to be designated a Curtiss control. The basic feature of a Curtiss control is that the rudder 13 shall be connected by means of the control cables 11 and 12 to the wheel 10, and that the ailerons 14 shall be operated by means of a shoulder brace as 16 through the aileron control cables 15. By means of the coupling devices 19 and 20 the footbar 22 is also connected to the ailerons 14 conjointly with the shoulder yoke 16. Hence it may be seen that either the footbar 22 or the shoulder yoke 16 may be used to operate the ailerons 14 or both may be used in conjunction to accomplish the above end, due to the fact that the coupling device 19 may be either connected to the footbar 22 through the plate 20 or to the shoulder yoke 16 or to both simultaneously, Fig. 2.

Furthermore, the rudder control cables 12 are connected to the plate 18 to which the plate 17 carrying the cables 11 is connected. The above mentioned plates as 17 and 18 and 16, 19 and 20 are coupled together securely by means of bolts, screws, or other suitable fastening devices.

The second method of connecting the convertible control is shown in Fig. 3. The connection here shown incorporates and embodies the principles of the Deperdussin control. The basic feature of this Deperdussin control is that the wheel 10 shall serve to operate the ailerons 14. This is done by means of the cable 11 which carries the plate 17 connected to the plate 19, the plate 19 being fixed as a moving part of the aileron control cables 15. A second feature of this Deperdussin control is that the footbar 22 shall serve to operate the rudder 13. This is done by means of the control cables 21 which carry the plate 20, said plate 20 being attached to the plate 18 which carries the rudder control cables 12. In the event of this type of connection the shoulder yoke connection 16 is left free and does not enter into the operation of the control in any way. In order that the direction of rotation of the wheel 10 may bear proper relationship to the movement of the ailerons 14, it is necessary that the cable 11 leading from the wheel 10 be crossed as shown in Fig. 3. The exact import of this latter statement is made clear by reference to Fig. 1 in which it is seen that the cable 11 is not crossed. A turnbuckle 23 serves to compensate for variations in length due to the crossing and uncrossing of the cable 11 when changing from one control to the other.

The operation of my invention is as follows:

The aileron control cables 15 are permanently connected to the plate 19; the rudder control cables 12 are permanently connected to the plate 18. The cables 11 which lead to the control wheel 10 are connected to the plate 17, and the cables 21 which lead to and are attached to the footbar 22 are connected to the plate 20.

Suppose the apparatus to be connected for operation as a Curtiss control. The plate 17 will then be connected to the plate 18, and the plate 19 will be connected to the shoulder yoke projection 16. The plate 20 may or may not be connected, depending upon whether the operator desires to operate the footbar 22 and shoulder yoke 16 simultaneously to warp the ailerons 14.

When it is desired to operate the apparatus as a Deperdussin control it is only necessary to disconnect the coupling devices and reconnect them as follows: Plate 17 connects to plate 19 thereby causing the ailerons 14 to be operated by the wheel 10. The plates 18 and 20 are attached, thereby establishing connection between the rudder 13 and footbar 22. The cable 11 is crossed as before described, and proper adjustment is made by means of the turnbuckle 23 to compensate for variation in the length of the cable 11 by reason of its having been crossed.

Although I have described more or less precise forms and details of construction, it is not to be understood that my invention is limited to the particular forms herein set forth as it may appear expedient during the construction to alter certain mechanical details of the invention without in any way departing from the fundamental principles herein disclosed.

What is claimed is:

1. A convertible control system comprising the control rudders of an aircraft, a control mechanism including one each of the elements common to each of two types of control mechanisms, one each of those elements individual to each of the two types, and interchangeable and detachable coupling devices intermediate said elements and said control rudders, whereby the rudders may be connected up according to either type of control.

2. A convertible control system comprising the control rudders of an aircraft, a control mechanism including one each of the elements common to each of two types of control mechanisms, one each of those elements individual to each of the two types, and interchangeable coupling devices intermediate said elements and said control rudders and also between certain of said control mechanism elements, whereby the rudders may be connected up according to either type of control.

3. A convertible control system comprising the control rudders of an aircraft, a control mechanism including one each of the elements common to each of two types of control mechanisms, one each of those elements individual to each of the two types, and interchangeable coupling devices between said control rudders on the one hand and a plurality of said control mechanism elements on the other arranged to interchangeably couple the rudders with the elements whereby the rudders may be connected up according to either type of control.

4. A convertible control system comprising the control rudders of an aircraft, a control mechanism including one each of the elements common to each of two types of control mechanisms, one each of those elements individual to each of the two types, and interchangeable coupling devices intermediate certain of said control rudders on the one hand and a plurality of said control mechanism elements on the other, and interchangeable coupling devices between certain other of said control rudders and one only of said control mechanism elements, whereby the rudders may be connected up according to their type of control.

5. A convertible control system for aircraft comprising a plurality of control rudders, a single control mechanism element, and a detachable coupling device intermediate said rudders and said element arranged to attach either of them independently thereto.

6. A convertible control system comprising a control device, and a plurality of elements of a control mechanism having different control characteristics, together with a detachable coupling device intermediate said elements and said control device arranged to attach either of said elements thereto independently of the other.

7. A convertible Curtiss-Deperdussin control system comprising ailerons and rudders, a rotatable control wheel, a control column oscillatable fore and aft, a shoulder yoke movable right and left, an oscillatable foot bar, and coupling devices intermediate said control mechanism elements and said control rudders arranged to effect connection of ailerons to the shoulder yoke, rudder to wheel, or to effect connection of ailerons to wheel and rudder to foot bar.

8. A convertible control system comprising a plurality of control rudders, and elements of two types of control mechanisms, control cables from each of the rudders and control mechanism elements extending inclosed circuits in proximity to each other, and coupling devices associated with said cables whereby they may be interconnected in various combinations.

9. A convertible control system comprising ailerons and a rudder, a rotatable control wheel, a shoulder yoke movable right and left, an oscillatable foot bar and coupling devices intermediate said control mechanism elements and said control rudder arranged to effect connection of the ailerons to the shoulder yoke, rudder to wheel, or to effect connection of the ailerons to wheel and rudder to foot bar.

10. A convertible control system comprising two control rudders, and elements of two types of control mechanisms, control cables from each of the rudders extending in closed circuits, control cables from each of said elements also extending in closed circuits and in proximity to the circuits from said rudders and coupling devices associated with said cables whereby the cables from either of said elements may be connected interchangeably with either of the cable circuits of the said rudders.

11. A convertible control system comprising two elements having different control characteristics and two control devices, control cables from each of the elements and the control devices extending in closed circuits, said cables extending in proximity to each other, and means for attaching the cables from either of said control elements to the cables from either of said control devices.

12. A convertible control system comprising a pair of control devices, a pair of elements having different control characteristics, a coupling device intermediate one of said control devices and one of said control elements, and a second coupling device between the other of said control devices and the other of said elements, said couplings being interchangeable and adapted to reverse the connections of the elements with the devices.

13. A convertible control system for aircraft comprising a pair of control elements of different characteristics, a single control device, and readily detachable means intermediate said elements and said control device adapted to connect said control device to either of said elements and simultaneously therewith disconnect said control device from the other.

14. A convertible control system for aircraft comprising two control elements having different control characteristics, a single control member and readily detachable coupling means disposed intermediate said elements and said control device for attaching either of said elements to said control device for the purpose set forth.

15. A convertible control system for aircraft comprising two control elements having different control characteristics, a pair of control devices adapted to be connected respectively with said elements, and means for readily shifting and interchanging the connections between said elements and said control devices whereby the control may be changed from one system to another without necessitating a redesign thereof.

16. In a convertible control system for aircraft, the combination of a control element, a second control element having different control characteristic from the first, an operating device connected with said first named element, a second operating device connected with said second named element, with means for readily interchanging the connections, so that the first element is connected with the second operating device and the second element may be connected with the first operating device.

In testimony whereof I affix my signature.

NELSON W. DALTON.